United States Patent
Jose et al.

(10) Patent No.: US 12,224,897 B2
(45) Date of Patent: Feb. 11, 2025

(54) ACTIVE NETWORK NODE RESILIENCE PATTERN FOR CLOUD SERVICE

(71) Applicant: SAP SE, Walldorf (DE)

(72) Inventors: Aby Jose, Kottayam (IN); Sowmya Lakshmi R, Bangalore (IN)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 17/986,213

(22) Filed: Nov. 14, 2022

(65) Prior Publication Data

US 2024/0163161 A1    May 16, 2024

(51) Int. Cl.
| | | |
|---|---|---|
| *H04L 41/0663* | (2022.01) | |
| *H04L 41/00* | (2022.01) | |
| *H04L 41/0816* | (2022.01) | |
| *H04L 41/0895* | (2022.01) | |

(52) U.S. Cl.
CPC ...... *H04L 41/0663* (2013.01); *H04L 41/0816* (2013.01); *H04L 41/0895* (2022.05); *H04L 41/20* (2013.01)

(58) Field of Classification Search
None
See application file for complete search history.

(56) References Cited

U.S. PATENT DOCUMENTS

| | | | |
|---|---|---|---|
| 2003/0145246 A1* | 7/2003 | Suemura | H04L 45/50 714/2 |
| 2016/0285750 A1* | 9/2016 | Saquib | H04L 43/0894 |
| 2023/0291636 A1* | 9/2023 | Kolar | H04L 41/0631 |

* cited by examiner

*Primary Examiner* — Angela Nguyen
(74) *Attorney, Agent, or Firm* — Buckley, Maschoff & Talwalkar LLC

(57) ABSTRACT

A system associated with a distributed cloud service may include an active network node within a network environment between a provider application and a consumer application. The active network node may have an execution environment, an operating system to support the execution environment, and active hardware. The active network node may automatically detect, via a platform and language independent centralized resilience process, a failure event in an active network that routes packets to support the distributed cloud service. The failure event might be associated with, for example, an unreliable network, a low bandwidth, a high latency, a topology change, transport costs, etc. Responsive to the detection of the failure event, the active network node may dynamically implement an application resilience pattern (e.g., a circuit breaker or bounded queue) by the centralized resilience process to facilitate recovery from the detected failure event without participation of the consumer application.

21 Claims, 21 Drawing Sheets

ACTIVE NETWORK NODE RESILIENCE PATTERN FOR CLOUD SERVICE

BACKGROUND

An enterprise may use distributed cloud services to perform business functions. For example, consuming applications may access a provider application via network nodes to calculate an amount of tax that is due in connection with a purchase transaction. For various reasons, however, the provider application might not be available to perform the function (e.g., the provider application may have failed or be currently handling an unusually high number of request causing extreme latency). To address such situations, consuming applications may implement "resilience patterns" to handle unexpected problems (e.g., circuit breaker or bounded queue resilience patterns). Having each application implement resilience applications, however, can be a time consuming and error prone process—especially when a substantial number of consuming applications or provider applications are involved. For example, different consuming applications may be associated with different programming languages and/or protocols making the maintenance and updating of resilience patterns difficult.

It would therefore be desirable to provide improved and efficient implementation of resilience patterns, such as those associated with a cloud services system, in a fast, automatic, and accurate manner.

SUMMARY

According to some embodiments, a system associated with a distributed cloud service may include an active network node within a network environment between a provider application and a consumer application. The active network node may have an execution environment, an operating system to support the execution environment, and active hardware (e.g., network processors). The active network node may automatically detect, via a platform and language independent centralized resilience process a failure event in an active network that routes packets to support the distributed cloud service. The failure event might be associated with, for example, an unreliable network, a low bandwidth, a high latency, a topology change, transport costs, etc. Responsive to the detection of the failure event, the active network node may dynamically implement an application resilience pattern (e.g., a circuit breaker or bounded queue) by the centralized resilience process to facilitate recovery from the detected failure event without participation of the consumer application.

Some embodiments comprise: means for automatically detecting, via a platform and language independent centralized resilience process at a computer processor of an active network node within a network environment, between a provider application and a consumer application, a failure event in an active network that routes packets to support a distributed cloud service, the active network node having an execution environment, an operating system to support the execution environment, and active hardware; and, responsive to the detection of the failure event, means for dynamically implementing an application resilience pattern by the centralized resilience process to facilitate recovery from the detected failure event without participation of the consumer application.

Some technical advantages of some embodiments disclosed herein are systems and methods to provide improved and efficient implementation of application resilience patterns for cloud services in a fast, automatic, and accurate manner.

DETAILED DESCRIPTION

In the following detailed description, numerous specific details are set forth to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. To provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

An enterprise may use distributed cloud services to perform business functions. For example, consuming applications may access a provider application via network nodes to execute a fraud detection process. For various reasons, however, the provider application might not be available to perform the function.

Figure 1:
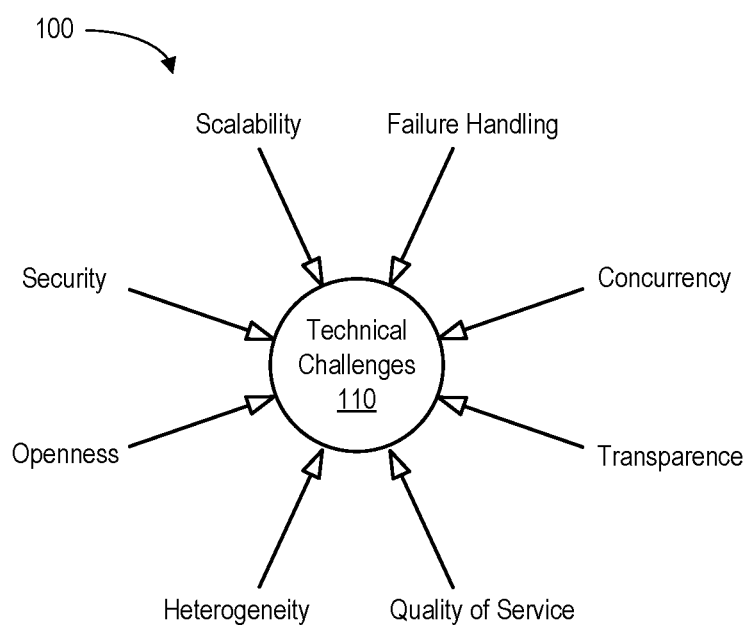
FIG. 1 illustrates some sources of technical challenges for a cloud service.

FIG. 1 illustrates 100 some sources of technical challenges 110 for a cloud service including, scalability, failure handling, concurrency, transparence, quality of service, heterogeneity, openness, security, etc. Some common misconceptions about distributed systems include: that the network is reliable; that latency is zero; that bandwidth is infinite; that the network is secure; that topology does not change; that there is one common, consistent administrator; that transport costs are zero; that the network is homogeneous; etc. Instead, a distributed system is one in which the failure of a computer that a user did not even know existed can render a service unavailable. In fact, failures in today's complex, distributed and interconnected systems are not the exception—they are the normal case and are not predictable.

Figure 2:
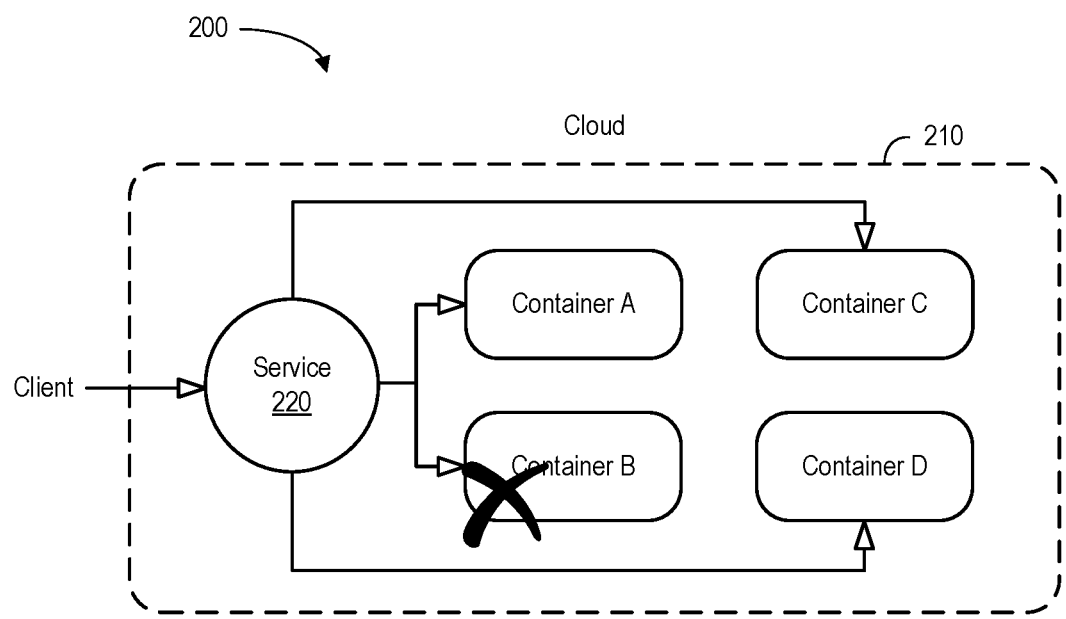
FIG. 2 illustrates cloud service resilience.
Figure 3:
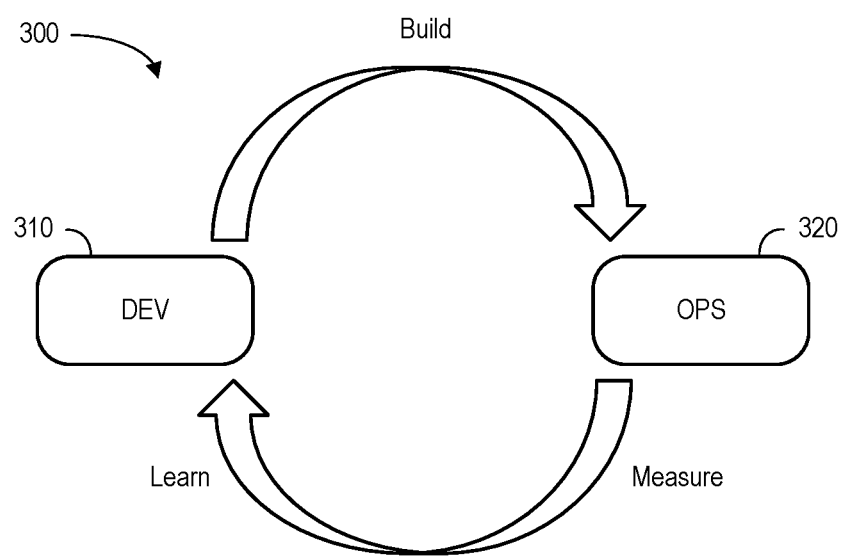
FIG. 3 illustrates resilience pattern software design.

To address such situations, consuming applications may implement "resilience patterns" to handle unexpected problems. The resilience may result in a user not even being aware of the problem or implement a graceful degradation of service. FIG. 2 illustrates 200 cloud service resilience. Here, a client accesses a cloud 210 service 220 that utilizes containers A through B. Moreover, as illustrated 200 one container is currently unavailable (container B as illustrated by the "X" in FIG. 2). As a result, a resilience pattern may be implemented such that the other containers (A, C, and D) are utilized instead. FIG. 3 illustrates 300 resilience pattern software design. A software development ("Dev") team 310 may implement a resilience measure to improve production availability and provide a build to an Information Technology ("IT") operations ("Ops") team 320. The Ops team 320 may measure the effect of the resilience measure so the enterprise may learn and improve resilience. In this way, generalizable solutions to recurring problems that occurs within a well-defined context may be created. The solutions may provide designers with a template showing how to solve a problem (and that can be used in many different situations). Although examples are described herein in connection with particular types of resilience patterns, note that embodiments might be associated with any other type of resilience pattern (e.g., a retry pattern, a timeout pattern, a fallback pattern, etc.).

Figure 4:
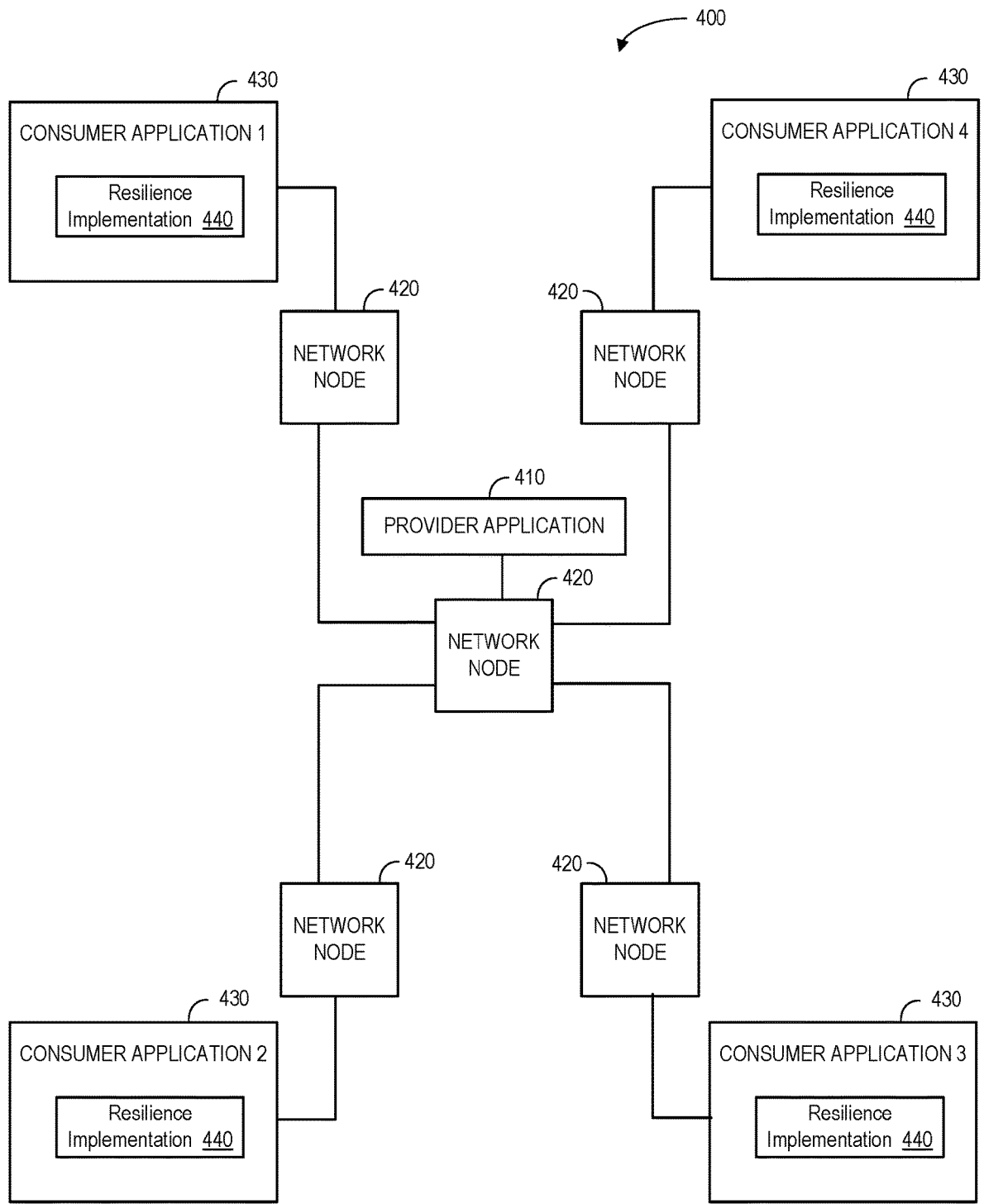
FIG. 4 illustrates a typical cloud service network.

FIG. 4 illustrates a typical cloud service network 400. The network 400 includes a provider application 410 that is accessed by consumer applications 430 (applications 1 through 4 in FIG. 4) via network nodes 420. Note that cloud services typically promise high reliability to the customers. Many service providers, for example, have a Service Level Agreement ("SLA") of over 99% availability with customers. There are many factors, however, that could adversely impact the reliability of cloud-based services. This is because in a distributed environment failures can occur for many reasons (unreliable networks, low bandwidth, high latency, topology changes, transport costs, etc.)—all of which can reduce the reliability of cloud services. To address this, cloud consumer applications 430 currently implement resilience patterns or implementations 440 to handle unexpected situations in the productive environment. The objective of these resilience implementations 440 is to identify reliability issues as early as possible and solve problems before a customer notices it or at least provide a graceful degradation of service. Some well-known resilience implementations 440 are circuit breakers, bounded queues, rate limits, timeout, and bulk heads.

Note that the resilience implementations 440 are implemented close to the consumer applications 430. That is, currently resilience implementations 440 are implemented in the client environment and tested against the availability of the provider application 410. As a result, each consumer application 430 needs to handle resilience explicitly to provide dedicated implementation for each consumer. Each consumer of the provider application 410 needs to implement the resilience implementations 440 which leads to duplicate efforts and/or each implementation could be different.

Moreover, the resilience implementations 440 may have a dependency on the programming language, Application Programming Interface ("API"), and/or protocols of the consumer applications 430. Foer example, consumer applications 430 might have been developed in different programming languages, be executed on different execution environment, use different protocols, etc. As a result, there may be a dependency on language, execution environment, protocols, etc. For example, there are many open-source resilience libraries available for a spring-boot java consumer application 430 but far fewer options for an Advanced Business Application Programming ("ABAP")-based consumer application 430. Similarly, each consumer application 430 may have different scope and development teams which can also cause resilience implementations 440 to vary (e.g., some teams might maintain a high quality for a resilience implementation 440 while another team does not spend enough).

In addition, each client needs to maintain the resilience implementations 440 which explicitly leads to maintenance overhead. Further, the provider application 410 by default cannot offer reliability. That is, with the current resilience implementations 440 it is not possible to have a central instance of a resilience implementation 440 that all clients can access. Overall, the network nodes 420 used only for routing (and there is no execution at the network nodes 420) because they are passive nodes that do not have intelligence and an execution environment.

Some embodiments described herein improve the reliability of cloud services with the effective utilization of "active" network nodes. Traditional network nodes are passive in nature and are used to route packets from a source to a destination. Traditional network nodes do not have execution environments and therefore are not capable of runtime decisions or executions. In contrast, "active" networks are a new generation of networks that implement active network nodes. Active network nodes have execution environments and can execute programs dynamically (making the network more effective and intelligent). Moreover, resilience patterns are the design patterns used by developers to handle unexpected situations that occur in a productive environment. These are solutions for well-known problems that occur in distributed systems and as well exponentially avoid duplication and maintenance of efforts. Traditionally, resilience patterns are implemented at the consumer applications. According to some embodiments described herein, resilience patterns are instead included into active network nodes (instead of consumer applications) and make use of their execution environment to handle the problems associated with distributed systems. That is, embodiments may provide a method to move resilience handling from consumer environment to the network—improving service reliability and associated efforts for maintainability.

Figure 5:
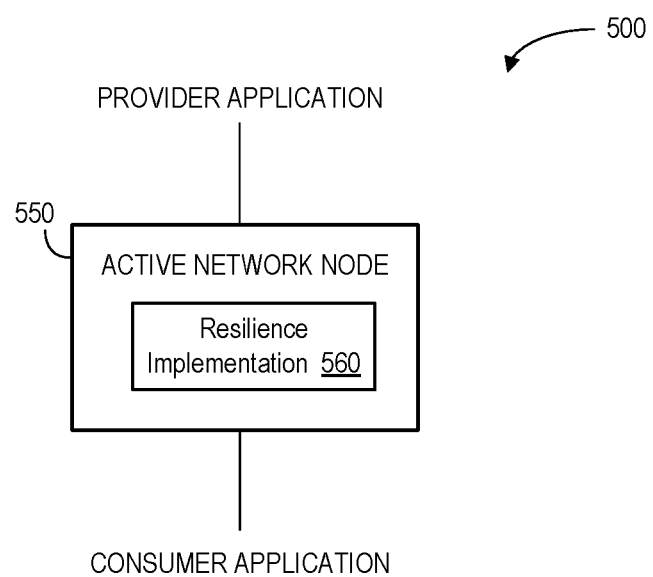
FIG. 5 is a high-level system architecture in accordance with some embodiments.

To provide improved and efficient implementation of application resilience patterns for cloud services in a fast, automatic, and accurate manner, FIG. 5 is a high-level system 500 architecture in accordance with some embodiments. The system 500 includes an active network node 550 between a provider application and a consumer application. As used herein, devices, including those associated with the system 500 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The active network node 550 may store information into and/or retrieve information from various data stores, which may be locally stored or reside remote from the active network node 550. Although a single active network node 550 is shown in FIG. 5, any number of such devices may be included. Moreover, various devices described herein might be combined according to embodiments of the present invention. For example, in some embodiments, the active network node 550 and a resilience implementation 560 might comprise a single apparatus. The system 500 functions may be automated and/or performed by a constellation of networked apparatuses, such as in a distributed processing or cloud-based architecture. As used herein, the term "automated" may refer to any process or method that may be performed with little or no human intervention.

An operator, administrator, or enterprise application may access the system 500 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various mappings or resilience parameters) and/or provide or receive automatically generated prediction results (e.g., reports and alerts) from the system 500.

The active network node 550 may include: an execution environment (e.g., Unix shell); and operating system capable of supporting one or more execution environments; and active hardware (e.g., a network processor). The resilience pattern or implementation 560 may provide an ability of the system 500 to manage and graciously recover from failures. The resilience implementation 560 may ensure that applications are available whenever users need them. Note that a resilience implementation 560 may have a mechanism to identify a failure event quickly and automatically. Moreover, the resilience implementation 560 may help prevent failures and/or preserve business continuity during a failure. Resilience implementations 560 might be associated with, for example, loose coupling (e.g., self-containment, asynchronous communication, relaxed temporal constraints, idempotency), isolation (e.g., bulkheads, complete parameter checking, shed load), latency control (e.g., bounded queues, circuit breakers, timeouts, fail fast), supervision (e.g., monitor, error handler), etc.

Figure 6:
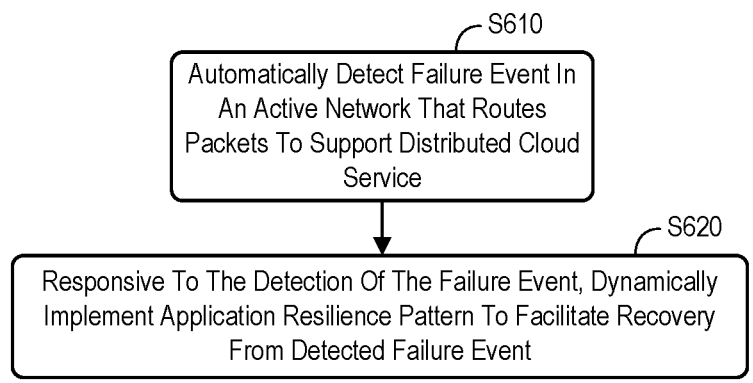
FIG. 6 is a method according to some embodiments.

FIG. 6 is a method that might be performed by some, or all, of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S610, a computer processor of an active network node within a network environment between a provider application and a consumer application may automatically detect, via a platform and language independent centralized resilience process, a failure event in an active network. That is, the centralized resilience process is independent of various platforms and/or languages used by one or more consumer applications. The active network may, for example, route packets to support a distributed cloud service. The active network node may have, for example, an execution environment, an operating system to support the execution environment, and active hardware. Responsive to the detection of the failure event, an application resilience pattern may be dynamically implemented by the centralized resilience process to facilitate recovery from the detected failure event at S620 without participation of the consumer application.

Figure 7:
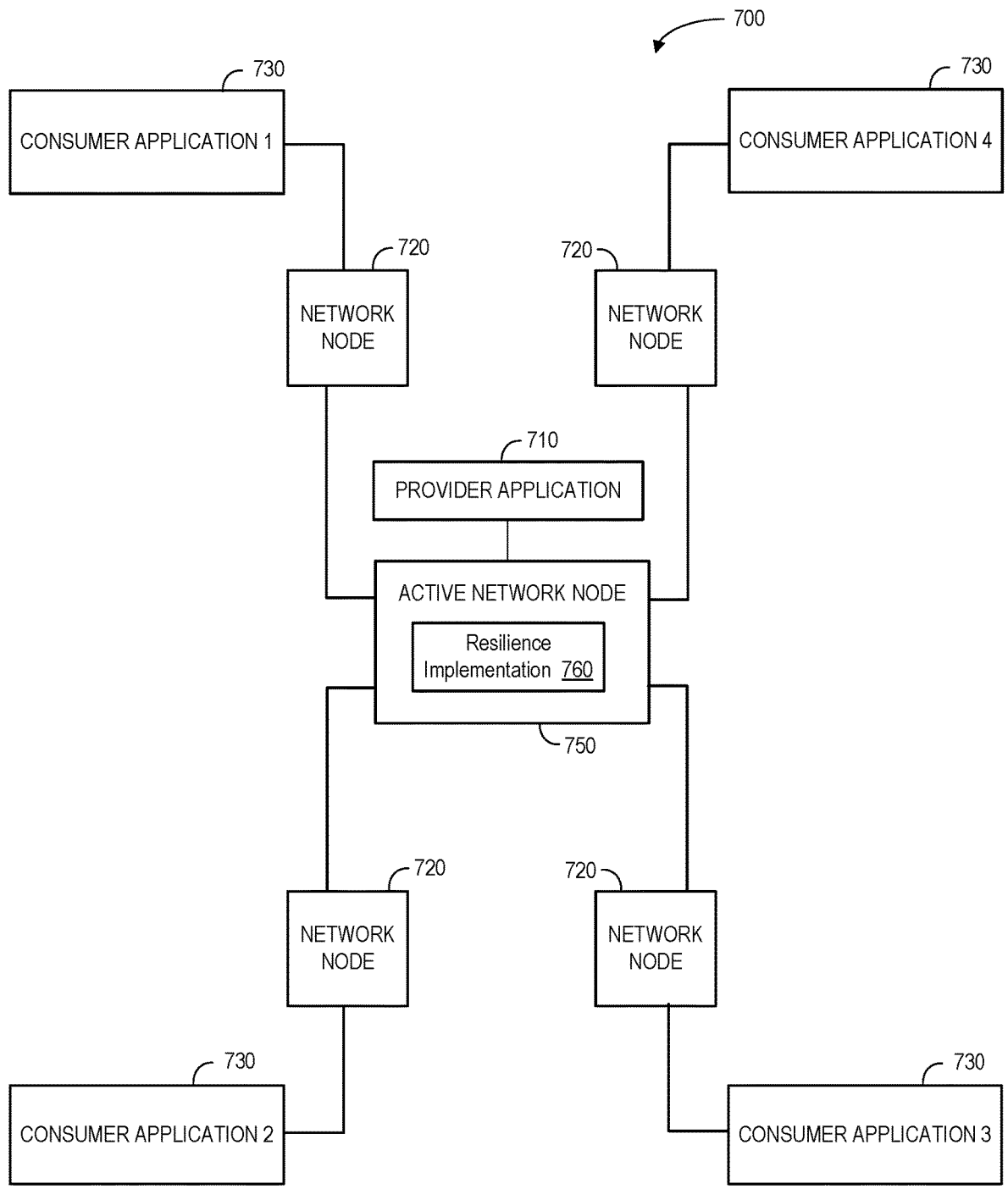
FIG. 7 is a proposed solution for a system to improve cloud service reliability with the effective utilization of active network nodes in accordance with some embodiments.

FIG. 7 is a proposed solution for a system 700 to improve cloud service reliability with the effective utilization of active network nodes in accordance with some embodiments. As before, the system 700 includes a provider application 710 that is accessed by consumer applications 730 (applications 1 through 4 in FIG. 7) via network nodes 720. In this case, however, cloud consumer applications do not implement resilience patterns—instead, a resilience implementation 760 is implemented in an active network node 750 to handle unexpected situations in the productive environment (e.g., circuit breaker, bounded queues, rate limits, timeout, bulk heads, etc.).

Note that the resilience implementations 760 are implemented close to the provider application 710 and are moved from the consumer environment to the network. As a result, the capabilities of the active network node 750 may be utilized effectively to execute resilience patterns dynamically. Moreover, the duplicate implementation of the resilience implementation 760 is eliminated from the consumer applications 730 by creating a centralized implementation in the network. This may help ensure that standardized reliability handling is done for all the consumer applications 730 that are involved (by the provider application 710). No specific skills or resilience implementations 760 are required by the consumer (who still receives all the reliability benefits) and dependency on programming language, execution environment, protocol, etc. may be eliminated (because execution happens in the active network node 750 which is triggered by data packets).

Instead of client-centric reliability handling, embodiments may provide network-centric reliability handling. Moreover, while typical passive networks are used only for packet routing active networks in accordance with some embodiments are capable of runtime executions and decision making (in addition to packet routing). In addition, embodiments may reduce platform, language, and protocol dependency for resilience implementation (and may be independent of language, platform, and protocols). Further, in the typical approach each consumer needs to handle reliability explicitly—but embodiments provided herein use centralized reliability handling (and every client can benefit without additional cost or efforts). For example, rate limits, timeouts, etc. no longer need to be controlled by the client, instead the network is capable of handling rate limits and timeouts (reducing server load). Similarly, each consumer application no longer needs resources with specific skill sets to handling reliability scenarios because reliability scenarios are handled in the network (no specific handling or skills are required by the consumers).

Figure 8:
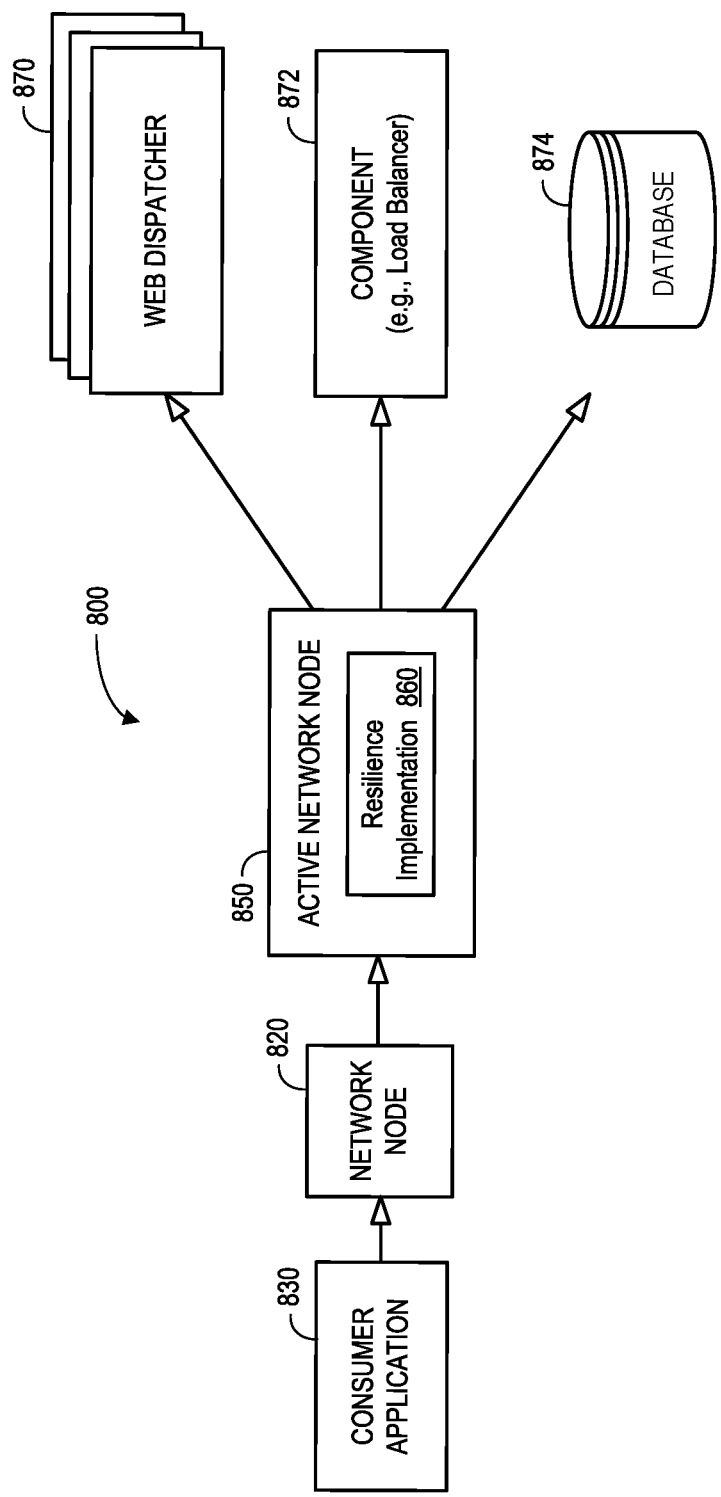
FIG. 8 is a use case according to some embodiments.

In one widely used scenario, a target can be another cloud service (including an external service). In this case, reliability patterns and handling can be moved out of consumer and into the network active network to handle cloud reliability. FIG. 8 is another use case 800 according to some embodiments. Here, a consumer application 830 accesses an active network node 850 via one or more network nodes 820. Moreover, the active network node 850 incorporates a resilience implementation 860 in support of a web dispatcher 870, component 872 (e.g., a load balancer), and/or a database 874. That is, it is also possible that a target can be the web dispatcher 870, the component 872, and/or the database 874. In this case, the proposed architecture can handle the load, etc. in the network and prevent the web dispatcher 870, the component 872, and/or the database 874 from getting overloaded. In this way, the unexpected crashing of such components can be prevented (without specific handling by the client) helping ensure the reliability of cloud. Although a load balancer is one example of a component 872, note that it might comprise any component 872 that receives and processes input from multiple sources (e.g., an application server, API gateway, etc.). Embodiments may protect any of such components 872 from becoming overloaded and crashing.

Figure 9:
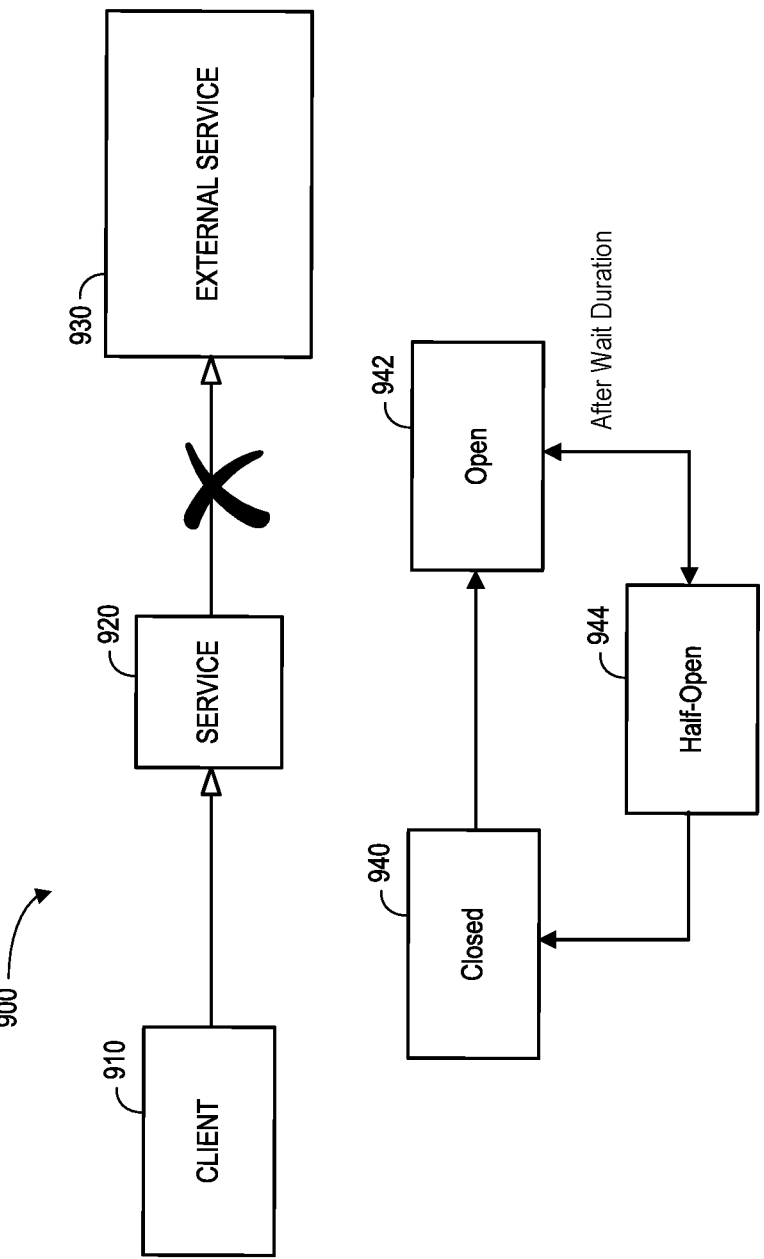
FIG. 9 is a circuit breaker pattern.

FIG. 9 is a circuit breaker pattern 900. Here, a client 910 attempts to access an external service 930 via another service 920. The circuit breaker pattern 900 is an application resilience pattern that can be used to limit several requests to a service based on configured thresholds—helping to prevent the service from being overloaded. The circuit breaker pattern 900 may continuously monitor for failures. Once failure reaches a defined threshold, the circuit breaker trips, and all further calls to the circuit breaker return with an error. The circuit breaker pattern 900 may move between the following states: from closed 940 to open 942, from half-open 944 to closed 940, and between open 942 and half-open 944. When closed 940, the service can be accessed and if failures exceed a threshold value, the circuit will trip and will move to open 942. When open 942, the service is not available and the failures are recorded. After a wait time duration has elapsed, the breaker transitions from open 942 to half-open 944 and allows only a configurable number of calls. Further calls are rejected until all permitted calls have been completed. If the failure rate or slow call rate is greater than or equal to the configured threshold, the state changes back to open 942. If the failure rate and slow call rate is below the threshold, the state changes back to closed 940.

Figure 10:
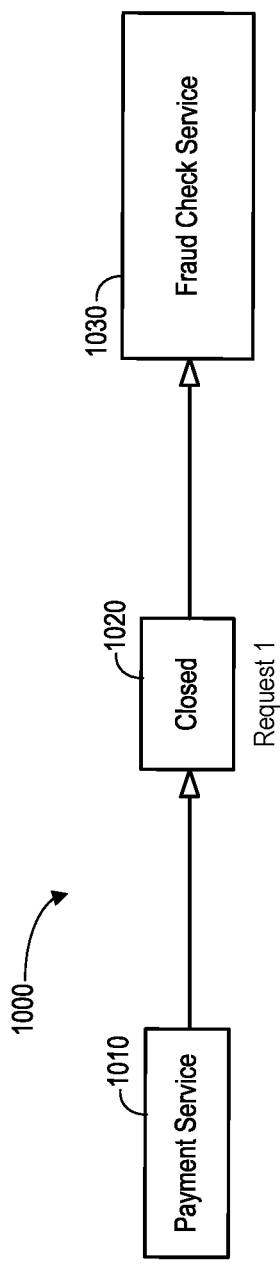
FIG. 10 is a circuit breaker example.
Figure 10:
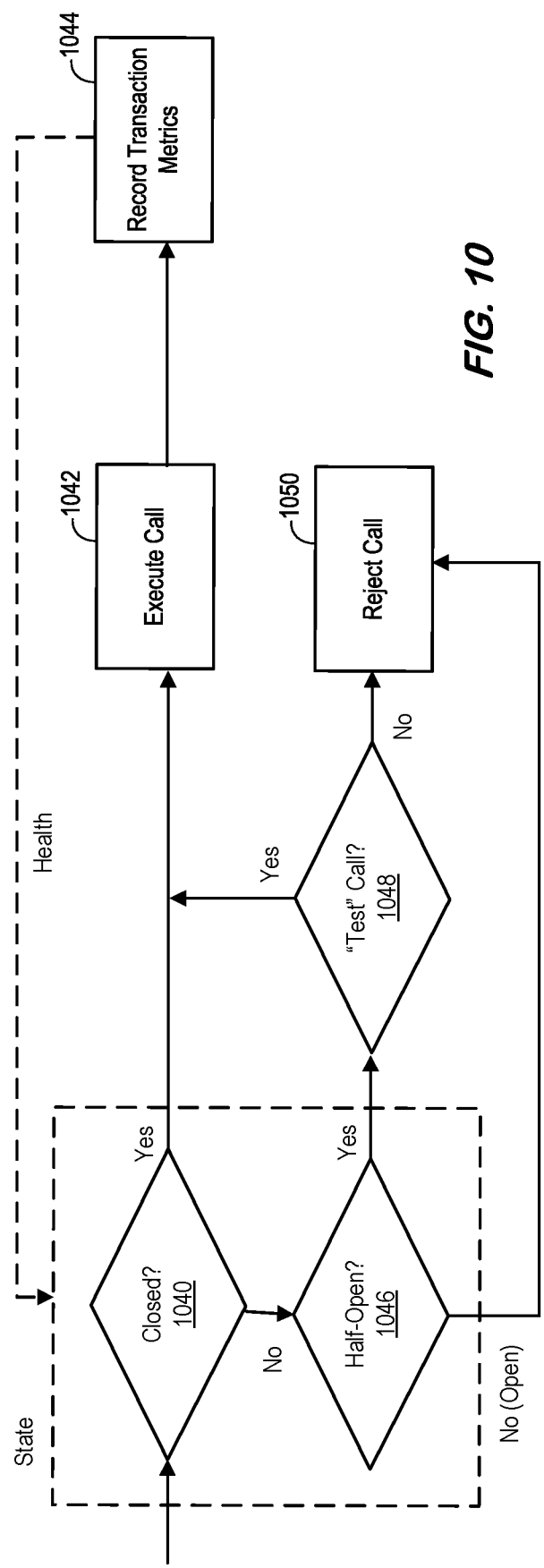

FIG. 10 is a circuit breaker example 1000. Here, a payment service 1010 sends a request to a fraud check service 1030 (e.g., through a closed 1020 circuit breaker). After checking that it is closed at 1040, a call is executed 1042 and transaction metrics are recorded 1044. If the state was not closed at 1040 and not half-open at 1042 (therefore "open") the call is rejected at 1050. If the state was half-open at 1046 and not a "test" call at 1048, the call is also rejected at 1050. In the case of a "test" call, it may be executed at 1042 and transaction metrics may be recorded at 1044.

The circuit breaker is a widely used resilience pattern that is typically implemented at the consumer application and is used to limit a number of requests to a service based on configured thresholds (to help prevent the service from being overloaded). The pattern can help to minimize failure impact and user experience by achieving one of the following:

handle and support to resolve the service unavailability issue automatically without being noticed by the end user; or inform the end user about the temporary service unavailability with a graceful degradation.

Figure 11:
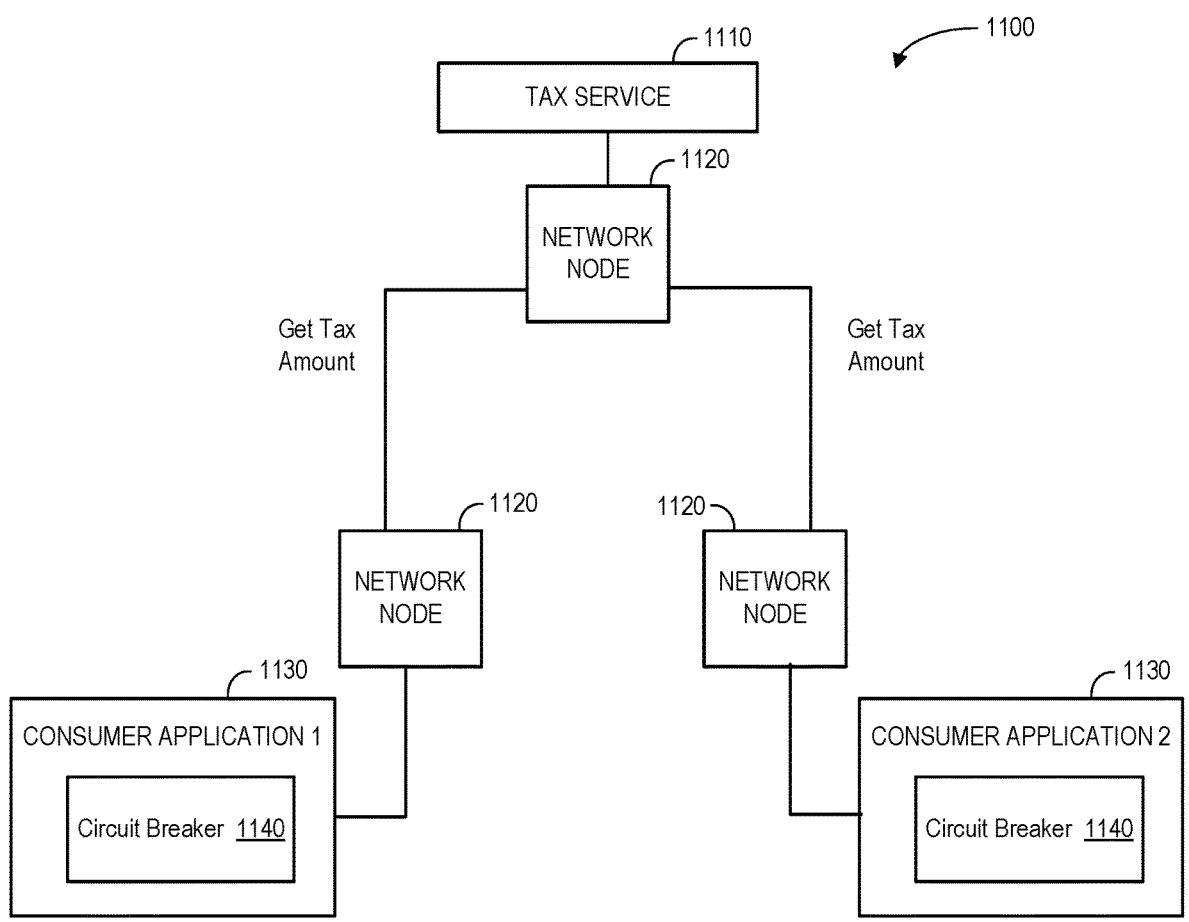
FIG. 11 is a typical circuit breaker implementation.

FIG. 11 is a typical circuit breaker implementation 1100 where a "tax service" 1110 is an external service (provider service) that can be used to retrieve tax rates for transactions. Many consumer applications 1130 consume the tax service 1110 via network nodes 1120 to retrieve the tax payable information. These consumer applications 1130 may be developed in various languages and deployed on various platforms (and APIs may be used for consumer-provider communications). Each consumer application 1130 implements the circuit breaker 1140 pattern to gracefully handle service load issues at production. Since the consumer applications 1130 are developed in different languages, running on different platforms, the implementation 1100 may need to use multiple native resilience libraries.

Figure 12:
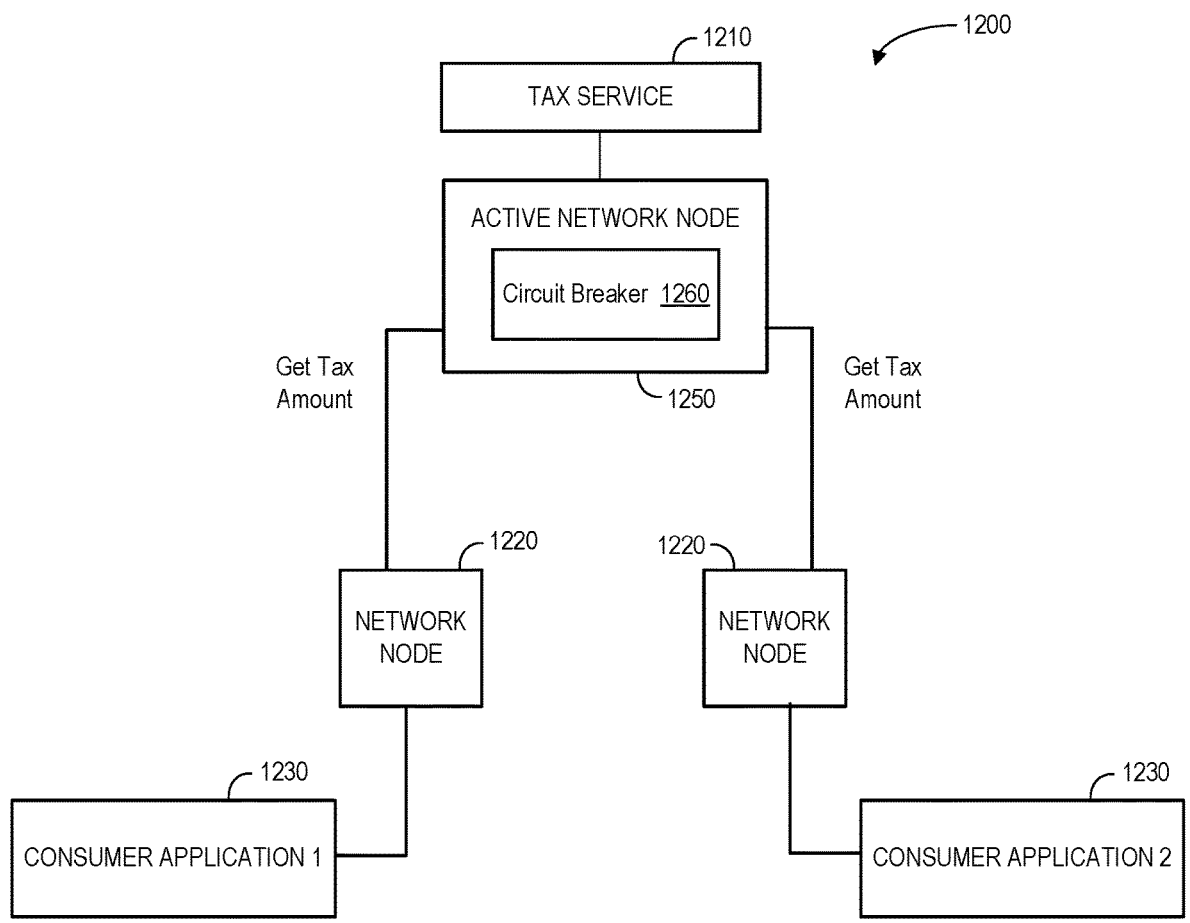
FIG. 12 is a circuit breaker implementation according to some embodiments.

FIG. 12 is a circuit breaker implementation 1200 according to some embodiments. As before, many consumer applications 1230 consume a tax service 1210 via network nodes 1220 to retrieve the tax payable information. In this case, however, the implementation of the circuit breaker 1260 pattern is moved to the network. The circuit breaker 1260 pattern is at an active network node 1250 and gets triggered based on when requests from consumer applications 1230 are received. Such an approach makes it centralized and language/platform independent. Moreover, duplicate implementation in each consumer application 1230 is avoided.

Figure 13:
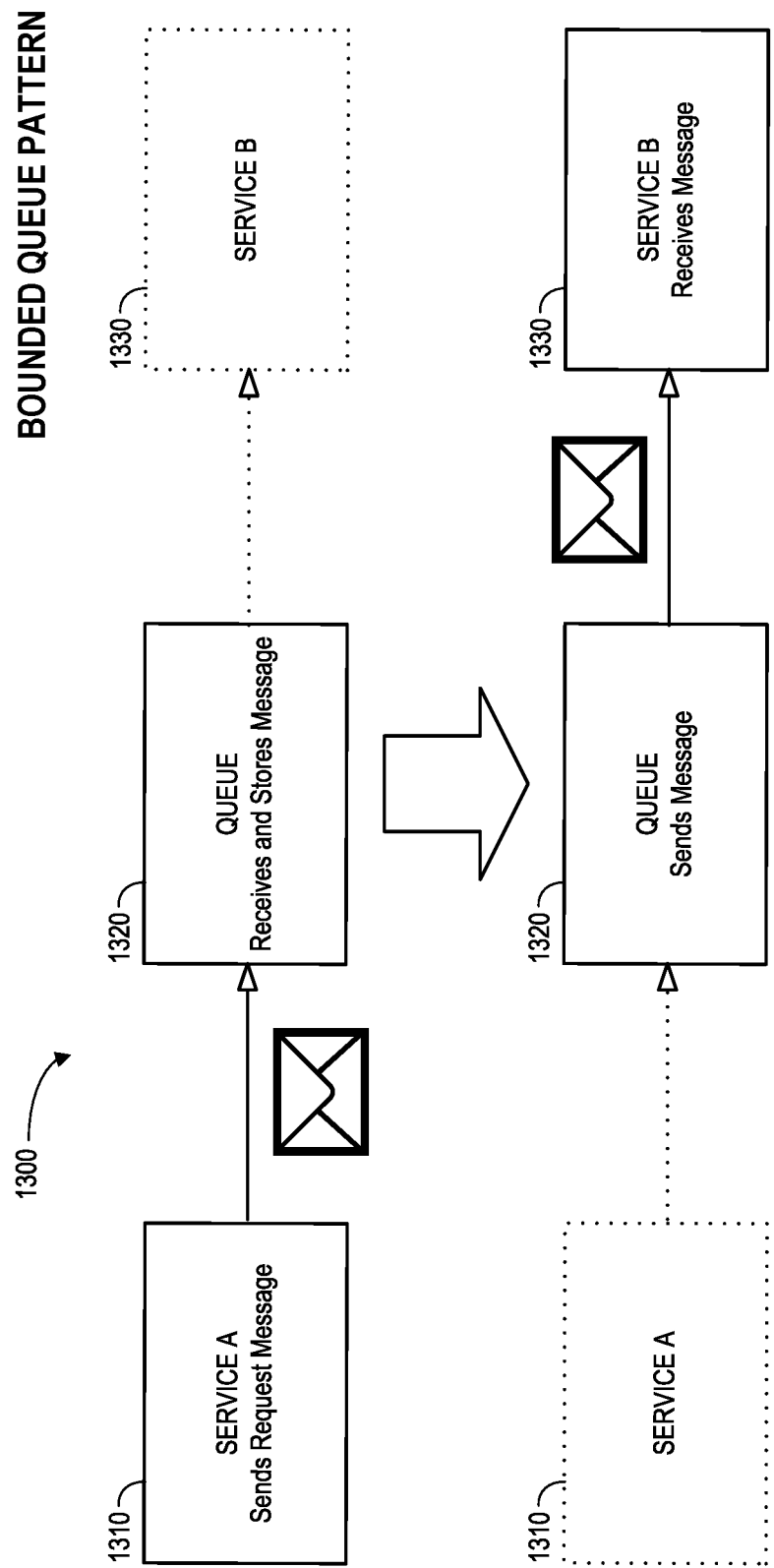
FIG. 13 is a bounded queue pattern.

A "bounded queue" pattern may be used in the asynchronous processing paradigm to slow down a busy service by initially inserting requests into a queue. FIG. 13 is a bounded queue pattern 1300 where service A 1310 sends a request to a queue 1320. The number of requests that an application can process at one point in time can be decided by the size of queue 1320. If the queue 1320 is not full, the request is then sent to service B 1330. If the queue 1310 becomes full, it creates a back pressure by rejecting additional messages. This ensures that that application (e.g., service B 1330) will not get overloaded and crash. Another advantage is that, if network latency causes a database to be not available momentarily, the data can remain in the queue. When the database is again available, the worker can pick the data from the queue and write it to the database.

Figure 14:
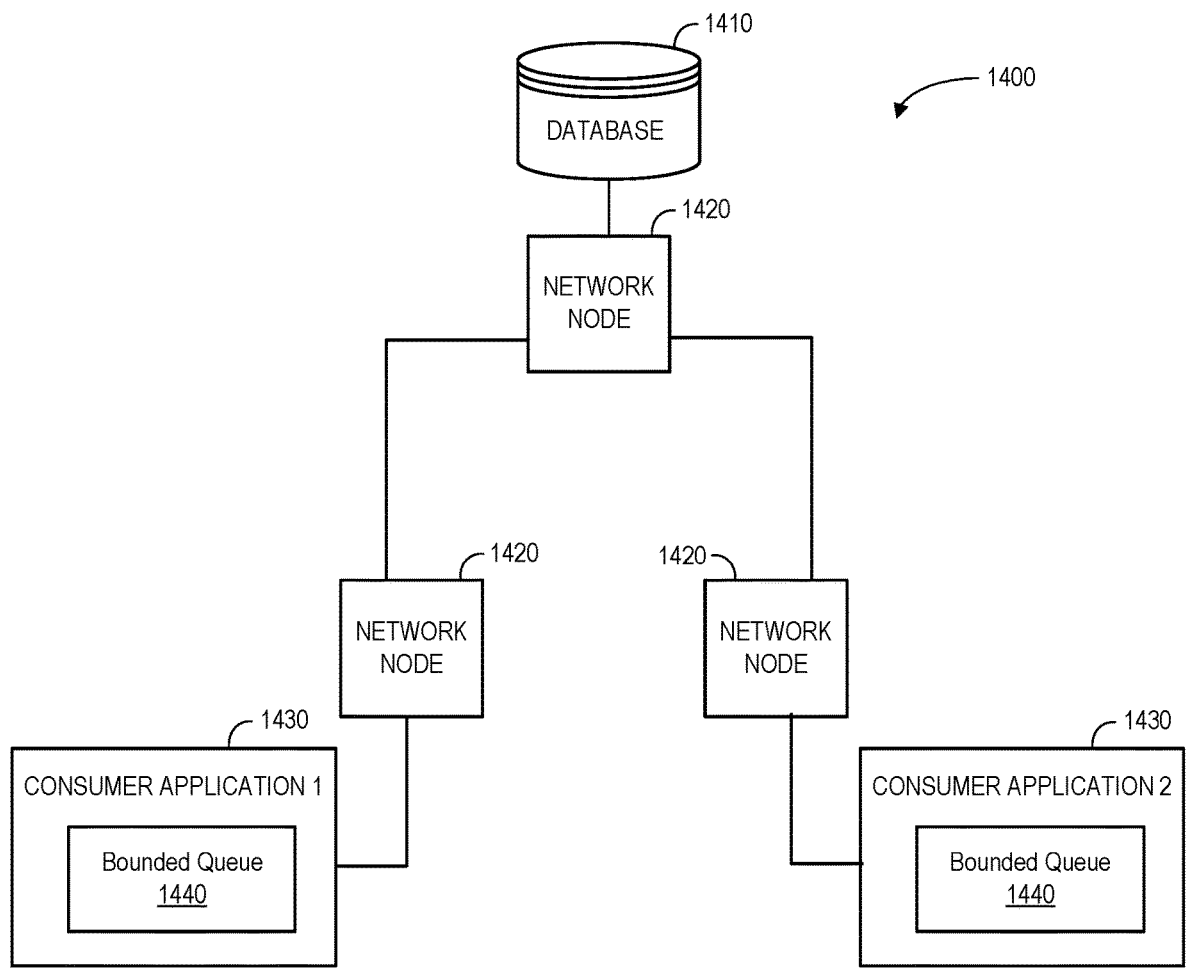
FIG. 14 is a typical bounded queue implementation.

FIG. 14 is a typical bounded queue implementation 1400. Many consumer applications 1430 consume a database 1410 via network nodes 1420. These consumer applications 1430 may be developed in various languages and deployed on various platforms. Each consumer application 1430 implements the bounded queue 1440 pattern to gracefully handle failure events.

Figure 15:
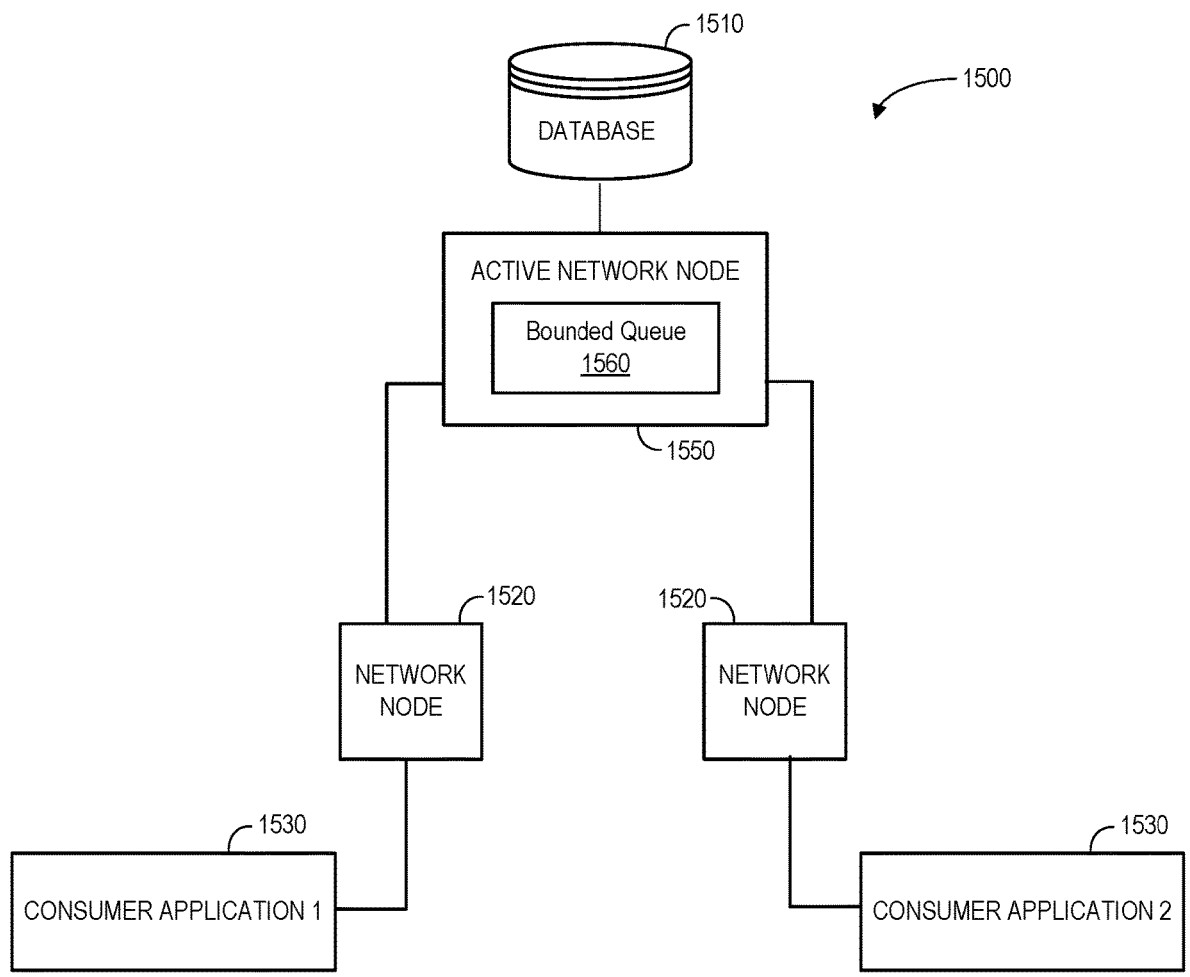
FIG. 15 is a bounded queue implementation in accordance with some embodiments.

FIG. 15 is a bounded queue implementation 1500 in accordance with some embodiments. As before, many consumer applications 1530 access a database 1510 via network nodes 1520. In this case, however, the implementation of the bounded queue 1560 pattern is moved to the network. The bounded queue 1560 pattern is at an active network node 1550 and gets triggered based on when requests from consumer applications 1530 are received. Such an approach makes it centralized and language/platform independent. Moreover, duplicate implementation in each consumer application 1530 is avoided.

Figure 16:
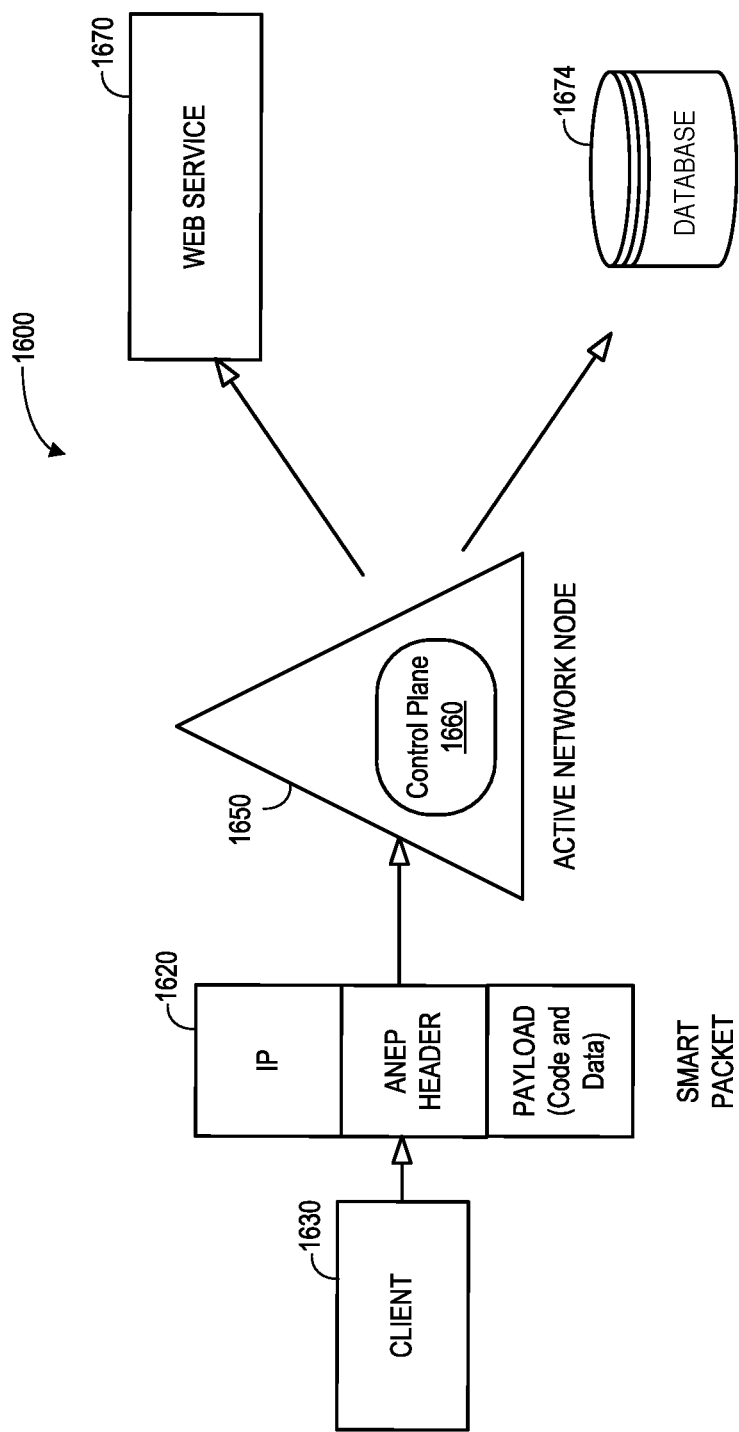
FIG. 16 shows architecture 1600 details for a system according to some embodiments.

FIG. 16 shows architecture details for a system 1600 according to some embodiments. In such a system 1600, a client 1630 sends a smart packet 1620 to an active network node 1650 associated with a web service 1670, database 1674, etc. Note that a resilience implementation in the active network node 1650 might take one of two approaches:
- a discrete approach in which programs are injected into active network node 1650 separately from passive data; and
- an integrated approach in which programs are integrated into every packet along with passive data.

The system 1600 of FIG. 16 incorporates the discrete approach, where resilience patterns will be injected to the active network node 1650 as an executable program. In this way, resilience patterns may be available in active network nodes and any consumer can benefit from it without explicitly handling the scenario. This may be referred to as a control plane 1660 because the patterns control reliability, etc.

Embodiments may integrate data along with smart packets 1620 and send the same to the active network node 1650 (or data plane). The data plane may act as a trigger for the control plane 1660. When the smart packet 1620 is received, the integrated data triggers the control plane 1660 execution. For example, the smart packet 1620 payload may contain code and data including:
Perform packet authorization
If (authorized==false)
Return "ERROR"
Else
Trigger Failure Handling and Resilience patterns in the AN According to some embodiments, the Active Network ("AN") lets an individual user, or groups of users, inject customized programs into the nodes of the network. The active network uses smart packets (with code and data) and includes:
- active network nodes that can execute code on the data; and
- active packets that carry code to active network nodes.

Figure 17:
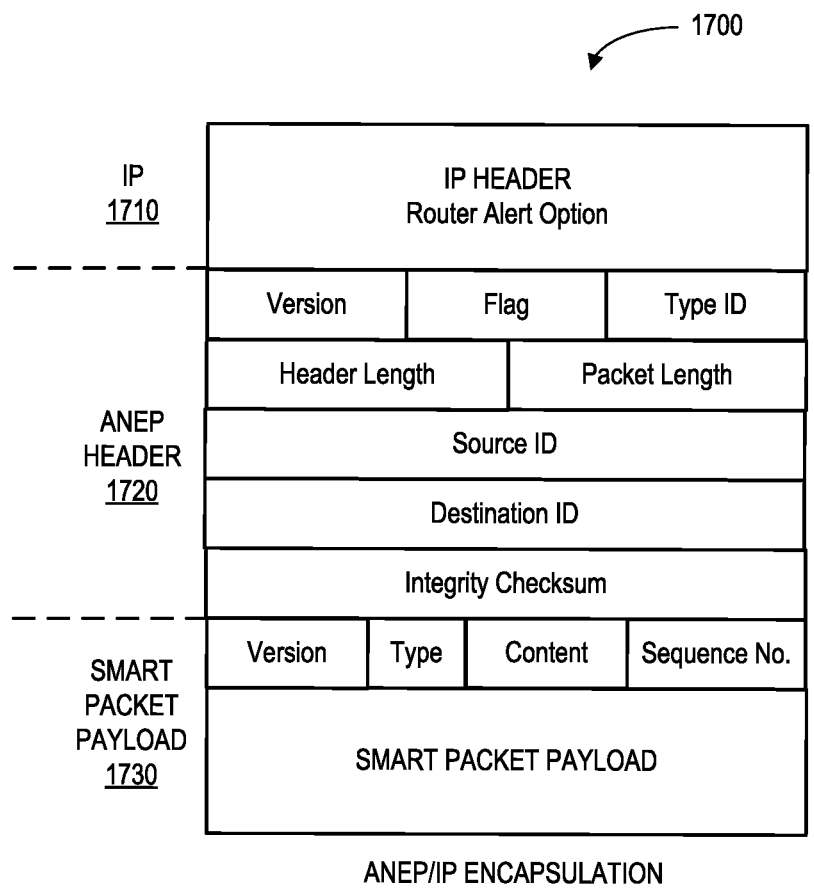
FIG. 17 is an example 1700 of a smart packet in accordance with some embodiments.

FIG. 17 is an example of a smart packet 1700 in accordance with some embodiments. The smart packet 1700 includes an IP portion 1710 with an IP header and a router alert option. The smart packet 1700 may also include an Active Network Encapsulation Protocol ("ANEP") header portion 1720 with a version, flag, type identifier, header length, packet length, source identifier, destination identifier, integrity checksum, etc. In addition, the smart packet 1700 may include a smart packet payload portion 1730 with a version, type, content, sequence number etc.

Figure 18:
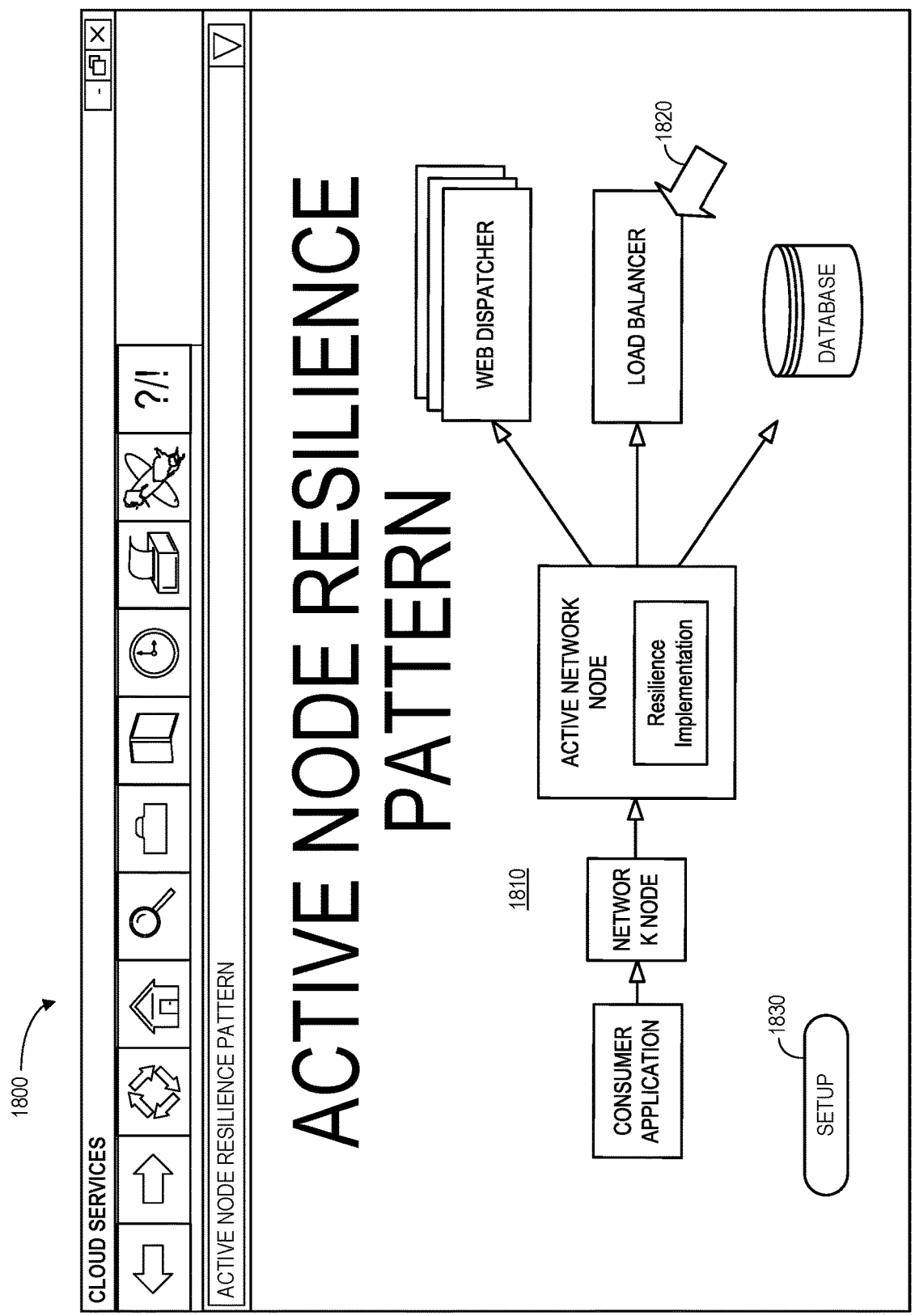
FIG. 18 is a human machine interface display according to some embodiments.

FIG. 18 is a human machine interface display 1800 in accordance with some embodiments. The display 1800 includes a graphical representation 1810 of elements of cloud-based computing environment (e.g., to efficiently implement resilience patterns). Selection of an element (e.g., via a touchscreen or computer pointer 1820) may result in display of a pop-up window containing various options (e.g., to adjust rules or logic, assign various devices, etc.). The display 1800 may also include a user-selectable "Setup" icon 1830 (e.g., to configure parameters such as thresholds for resilience patterns as described with respect any of the embodiments described herein).

Figure 19:
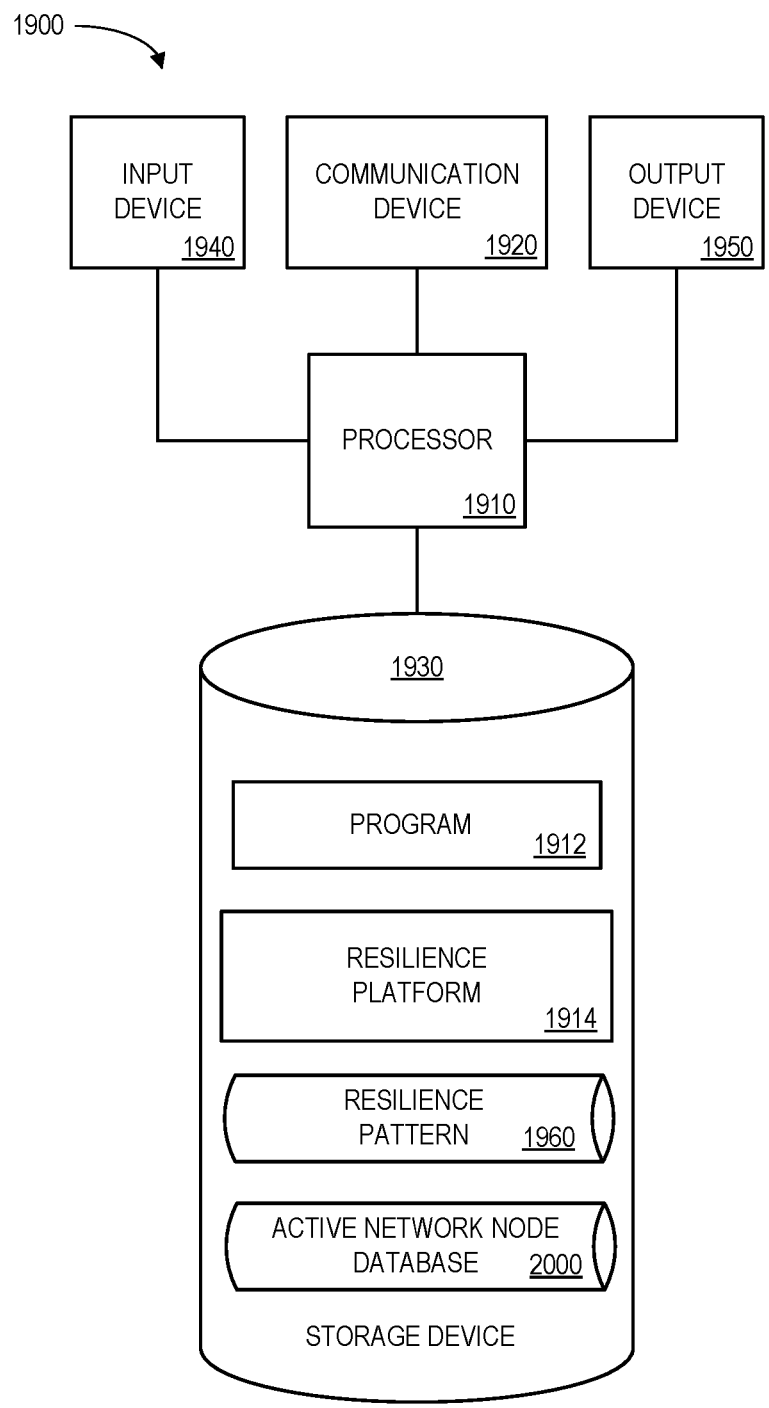
FIG. 19 is an apparatus or platform according to some embodiments.

Note that the embodiments described herein may be implemented using any number of different hardware configurations. For example, FIG. 19 is a block diagram of an apparatus or platform 1900 that may be, for example, associated with the system 500 of FIG. 5 (and/or any other system described herein). The platform 1900 comprises a processor 1910, such as one or more commercially available Central Processing Units ("CPUs") in the form of one-chip microprocessors, coupled to a communication device 1920 configured to communicate via a communication network (not shown in FIG. 19). The communication device 1920 may be used to communicate, for example, with one or more remote user platforms, cloud resource providers, etc. The platform 1900 further includes an input device 1940 (e.g., a computer mouse and/or keyboard to input rules or logic) and/an output device 1950 (e.g., a computer monitor to render a display, transmit predictions or alerts, and/or create recommendations). According to some embodiments, a mobile device and/or PC may be used to exchange information with the platform 1900.

The processor 1910 also communicates with a storage device 1930. The storage device 1930 can be implemented as a single database or the different components of the storage device 1930 can be distributed using multiple databases (that is, different deployment information storage options are possible). The storage device 1930 may comprise any appropriate information storage device, including combinations of magnetic storage devices (e.g., a hard disk drive), optical storage devices, mobile telephones, and/or semiconductor memory devices. The storage device 1930 stores a program 1912 and/or a resilience platform 1914 for controlling the processor 1910. The processor 1910 performs instructions of the programs 1912, 1914, and thereby operates in accordance with any of the embodiments described herein. For example, the processor 1910 may automatically detect, via a platform and language independent centralized resilience process, a failure event in an active network that routes packets to support a distributed cloud service. The failure event might be associated with, for example, an unreliable network, a low bandwidth, a high latency, a topology change, transport costs, etc. Responsive to the detection of the failure event, the processor 1910 may dynamically implement an application resilience pattern (e.g., a circuit breaker or bounded queue) by the centralized resilience process to facilitate recovery from the detected failure event without participation of the consumer application.

The programs 1912, 1914 may be stored in a compressed, uncompiled and/or encrypted format. The programs 1912, 1914 may furthermore include other program elements, such as an operating system, clipboard application, a database management system, and/or device drivers used by the processor 1910 to interface with peripheral devices.

As used herein, information may be "received" by or "transmitted" to, for example: (i) the platform 1900 from another device; or (ii) a software application or module within the platform 1900 from another software application, module, or any other source.

In some embodiments (such as the one shown in FIG. 19), the storage device 1930 further stores a resilience pattern 1960 and an active network node database 2000. An example of a database that may be used in connection with the platform 1900 will now be described in detail with respect to FIG. 20. Note that the database described herein is only one example, and additional and/or different information may be stored therein. Moreover, various databases might be split or combined in accordance with any of the embodiments described herein.

Figure 20:
FIG. 20 illustrates an active network node database in accordance with some embodiments.

Referring to FIG. 20, a table is shown that represents the active network node database 2000 that may be stored at the platform 1900 according to some embodiments. The table may include, for example, entries identifying active network nodes (e.g., with an execution environment, operating system, and active hardware). The table may also define fields 2002, 2004, 2006, 2008, for each of the entries. The fields 2002, 2004, 2006, 2008 may, according to some embodiments, specify: an active network node identifier 2002, a resilience pattern 2004, a provider application 2006, and consumer application 2008. The active network node database 2000 may be created and updated, for example, when new nodes are added, resilience patterns are adjusted, etc.

The active network node identifier 2002 might be a unique alphanumeric label or link, associated with an active network, that includes an execution environment, an operating system to support the execution environment, and active hardware. The resilience pattern 2004 may contain or describe an application resilience pattern that facilitates recovery from a detected failure event. The provider application 2006 may, according to some embodiments, execute a cloud service for several consumer applications 2008 in the active network.

Thus, embodiments may provide a system and method to improve cloud service reliability with the help of active network nodes.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 21:
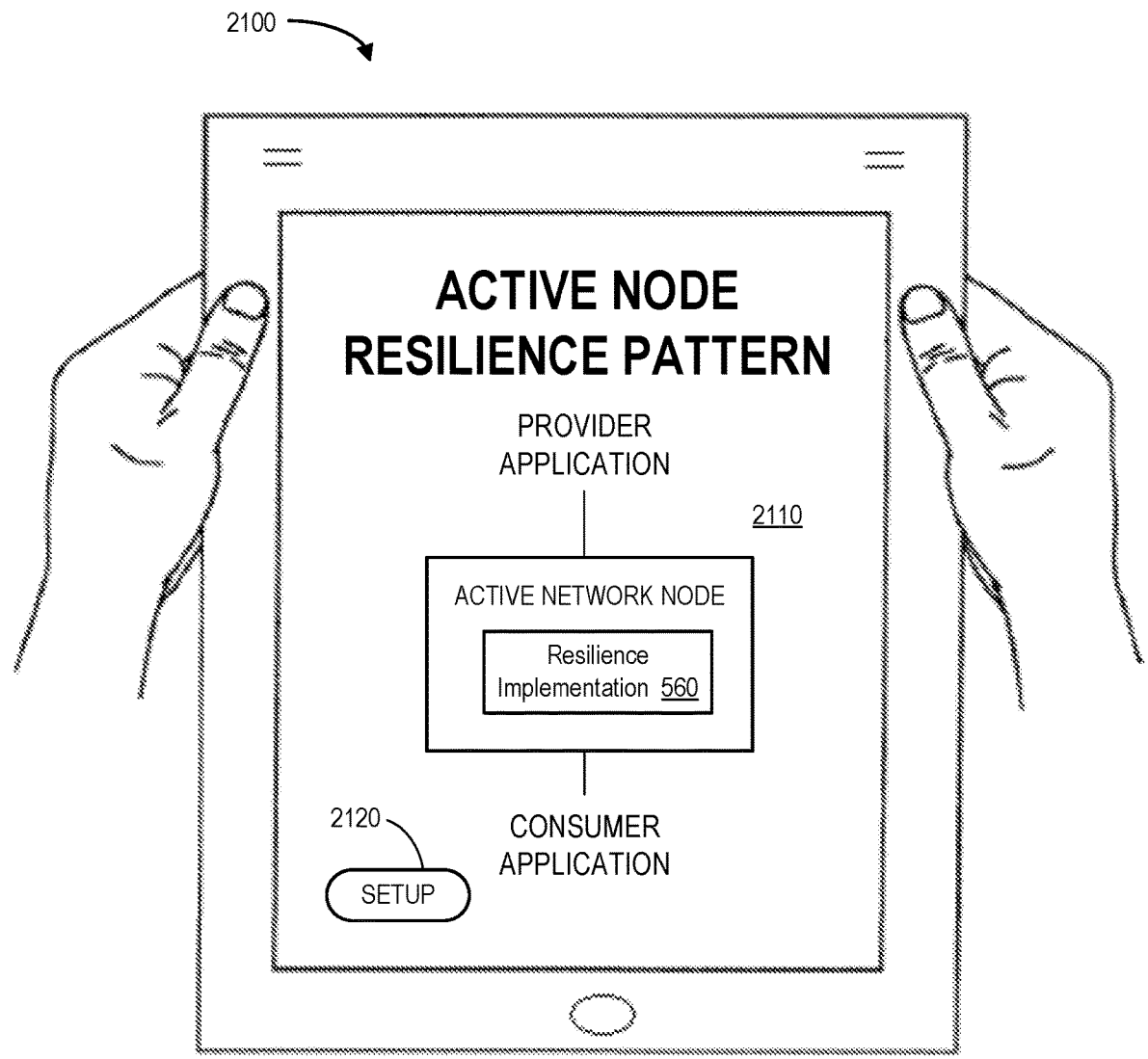
FIG. 21 illustrates a tablet computer according to some embodiments.

In some embodiments, specific resilience patterns are described. Note, however, that embodiments may be associated with any type of resilience pattern. Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and cloud services, any of the embodiments described herein could be applied to other types of applications and cloud services. In addition, the displays shown herein are provided only as examples, and any other type of user interface could be implemented. For example, FIG. 21 shows a tablet computer 2100 rendering a cloud services system display 2110. The display 2110 may, according to some embodiments, be used to view more detailed elements about components of the system (e.g., when a graphical element is selected via a touchscreen) and/or to configure operation of the system (e.g., to establish new rules or logic for the system via a "Setup" icon 2120).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a distributed cloud service, comprising:
an active network node within a network environment, between a provider application and a consumer application, the active network node having an execution environment, an operating system to support the execution environment, and active hardware, including:
a computer processor, and
a computer memory storage device, coupled to the computer processor, that contains instructions that when executed by the computer processor enable the active network node to:
(i) automatically detect, via a platform and language independent centralized resilience process of the active network node, a failure event in an active network that routes packets to support the distributed cloud service, and
(ii) responsive to the detection of the failure event, dynamically implement an application resilience pattern by the centralized resilience process to facilitate recovery from the detected failure event without participation of the consumer application.

2. The system of claim 1, wherein the active hardware comprises network processors.

3. The system of claim 1, wherein the failure event is associated with at least one of: (i) an unreliable network, (ii) a low bandwidth, (iii) a high latency, (iv) a topology change, and (v) transport costs.

4. The system of claim 1, wherein the active network node is associated with at least one of: (i) a target service, and (ii) an external service.

5. The system of claim 1, wherein the active network node is associated with at least one of: (i) a web dispatcher, (ii) a load balancer, (iii) a database, (iv) an application server, (v) an Application Programming Interface ("API") gateway and (vi) a component that receives and processes input from multiple sources.

6. The system of claim 1, wherein the application resilience pattern comprises a circuit breaker.

7. The system of claim 1, wherein the application resilience pattern comprises a bounded queue.

8. The system of claim 1, wherein the application resilience pattern is associated with a discrete approach where programs are injected into the active network node separately from passive data.

9. The system of claim 1, wherein the application resilience pattern is associated with an integrated approach where programs are integrated into smart packets along with passive data.

10. The system of claim 9, wherein a smart packet includes an Internet Protocol ("IP") header and an Active Network Encapsulation Protocol ("ANEP") header along with a payload.

11. The system of claim 1, wherein the application resilience pattern is associated with at least one of: (i) loose coupling, (ii) isolation, (iii) latency control, and (iv) supervision.

12. A computer-implemented method associated with a distributed cloud service, comprising:
automatically detecting, via a platform and language independent centralized resilience process at a computer processor of an active network node within a network environment, between a provider application and a consumer application, a failure event in an active network that routes packets to support the distributed cloud service, the active network node having an execution environment, an operating system to support the execution environment, and active hardware; and
responsive to the detection of the failure event, dynamically implementing an application resilience pattern by the centralized resilience process to facilitate recovery from the detected failure event without participation of the consumer application.

13. The method of claim 12, wherein the active hardware comprises network processors.

14. The method of claim 12, wherein the failure event is associated with at least one of: (i) an unreliable network, (ii) a low bandwidth, (iii) a high latency, (iv) a topology change, and (v) transport costs.

15. The method of claim 12, wherein the active network node is associated with at least one of: (i) a target service, (ii) an external service, (iii) a web dispatcher, (iv) a load balancer, (v) a database, (xi) an application server, (vii) an Application Programming Interface ("API") gateway and (viii) a component that receives and processes input from multiple sources.

16. The method of claim 12, wherein the application resilience pattern comprises a circuit breaker.

17. The method of claim 12, wherein the application resilience pattern comprises a bounded queue.

18. A non-transitory, computer readable medium having executable instructions stored therein to implement a method associated with a distributed cloud service, the method comprising:
automatically detecting, via a platform and language independent centralized resilience process at a computer processor of an active network node within a network environment, between a provider application and a consumer application, a failure event in an active network that routes packets to support the distributed cloud service, the active network node having an execution environment, an operating system to support the execution environment, and active hardware; and
responsive to the detection of the failure event, dynamically implementing an application resilience pattern by the centralized resilience process to facilitate recovery from the detected failure event without participation of the consumer application.

19. The medium of claim 18, wherein the application resilience pattern is associated with a discrete approach where programs are injected into the active network node separately from passive data.

20. The medium of claim 18, wherein the application resilience pattern is associated with an integrated approach where programs are integrated into smart packets along with passive data.

21. The medium of claim 20, wherein a smart packet includes an Internet Protocol ("IP") header and an Active Network Encapsulation Protocol ("ANEP") header along with a payload.

* * * * *